United States Patent [19]

Hert et al.

[11] Patent Number: 5,624,994
[45] Date of Patent: Apr. 29, 1997

[54] PROCESS FOR THE PREPARATION OF COMPOSITE MATERIAL FORMED FROM A VULCANIZED ELASTOMER IN COMBINATION WITH A THERMOPLASTIC ELASTOMER CONTAINING POLYAMIDE BLOCKS, COMPOSITE MATERIAL THUS FORMED AND SPORTS ARTICLES PRODUCED WITH THE AID OF SAID MATERIALS

[75] Inventors: Marius Hert, Serquigny; Patrick Alex, Limours Pecquese, both of France

[73] Assignee: Elf Atochem S. A., Puteaux, France

[21] Appl. No.: 543,064

[22] Filed: Oct. 13, 1995

Related U.S. Application Data

[63] Continuation of Ser. No. 375,567, Jan. 13, 1995, abandoned, which is a continuation of Ser. No. 999,401, Dec. 31, 1992, abandoned.

Foreign Application Priority Data

Dec. 31, 1991 [FR] France ................... 91 16400

[51] Int. Cl.$^6$ ................... C08J 3/24; C08K 5/36; C08L 53/00
[52] U.S. Cl. ................... 524/505; 524/514; 524/538; 525/66; 525/178; 525/183; 525/184; 264/255; 264/259; 264/275; 427/393.5; 36/25 R; 36/32 R; 36/31; 36/114
[58] Field of Search ................... 524/492, 493, 524/505, 514, 538; 525/66, 183, 178, 184; 264/255, 259, 275; 427/393.5; 36/25 R, 32 R, 31, 114

[56] References Cited

U.S. PATENT DOCUMENTS

| | | | |
|---|---|---|---|
| 3,972,973 | 8/1976 | Yardley et al. | 264/265 |
| 4,996,263 | 2/1991 | Pyke et al. | 525/178 |
| 5,132,182 | 7/1992 | Grosse-Puppendahl et al. | 428/475.8 |

FOREIGN PATENT DOCUMENTS

| | | |
|---|---|---|
| 0266982 | 5/1988 | European Pat. Off. . |
| 0344427A2 | 12/1989 | European Pat. Off. . |
| 1387583 | 3/1975 | United Kingdom . |
| 1434719 | 5/1976 | United Kingdom . |

*Primary Examiner*—Paul R. Michl
*Assistant Examiner*—U. K. Rajguru
*Attorney, Agent, or Firm*—Pennie & Edmonds

[57] ABSTRACT

The invention relates to a process for the preparation of composite material formed from a vulcanized elastomer, containing carboxylic acid or dicarboxylic acid anhydride groups, in combination with a thermoplastic elastomer containing polyamide blocks, which comprises vulcanizing an elastomer composition comprising said vulcanizable elastomer, a crosslinking system and, optionally, diverse adjuvants in a mold, one part of which is occupied by said thermoplastic elastomer containing polyamide blocks, the vulcanization temperature being between −15° C. and +5° C. with respect to the Vicat point of said thermoplastic elastomer containing polyamide blocks, the elastomer composition and the vulcanization kinetics being such that the material shows cohesive failure when subjected to stress for separation of the two elastomers.

This process leads to composite materials which have excellent properties, in particular in respect of tensile strength (cohesive failure).

The invention also relates to the composite material thus formed and its application in sports articles produced with the aid of said materials.

26 Claims, No Drawings

PROCESS FOR THE PREPARATION OF COMPOSITE MATERIAL FORMED FROM A VULCANIZED ELASTOMER IN COMBINATION WITH A THERMOPLASTIC ELASTOMER CONTAINING POLYAMIDE BLOCKS, COMPOSITE MATERIAL THUS FORMED AND SPORTS ARTICLES PRODUCED WITH THE AID OF SAID MATERIALS

This application is a continuation, of application Ser. No. 08/375,567, filed Jan. 13, 1995 now abandoned, which is a continuation of application Ser. No. 07/999,401, filed Dec. 31, 1992 now abandoned.

BACKGROUND OF THE INVENTION

1. Field of the Invention

The present invention relates to a process for the preparation of composite material formed from a vulcanized elastomer, containing carboxylic acid or dicarboxylic acid anhydride groups, in combination with a thermoplastic elastomer containing polyamide blocks. It also relates to the composite material composed of a vulcanized elastomer in combination with a thermoplastic elastomer containing polyamide blocks and sports articles, in particular the soles of sports shoes, at least partly composed of such a material.

2. Description of Prior Art

The processes most commonly used for joining synthetic or natural vulcanized elastomer with thermoplastics comprise several time-consuming steps which are difficult to automate:

- vulcanization of the elastomer part (by injection molding, compression etc.),
- combining of its surface,
- halogenation by treatment with a solution of chlorinated polyolefins and drying,
- application of a two-component adhesive generally based on polyurethane, and
- molding of the rubber with the thermoplastic.

These parts composed of an elastomer/thermoplastic assembly are used in particular in the shoe industry, in particular for high-quality sports shoes.

However, significant savings at the process level could be achieved by omitting some of the operations described above, in particular the entire section relating to the application of the adhesive.

The reactivity of some elastomers with polymers based on polyetheresteramide is also known. Thus, Japanese Patent JP 63 081159 (DW 88-038019/20) describes a thermoplastic elastomer composition composed of a polyetheresteramide component and an elastomer having at least one polar group, such as a carboxylic radical. Amongst these elastomers, acrylic elastomers, elastomers based on butadiene and acrylonitrile (nitrile elastomer) and fluorinated elastomers (propylene/tetrafluoroethylene) may be mentioned. These thermoplastic elastomer compositions have a high flexibility, a good resistance to oil and a high mechanical strength.

SUMMARY OF THE INVENTION

One of the aims of the present invention is to provide a process for the preparation of composite material as defined above, eliminating the application of an adhesive.

Another aim of the present invention is to provide a process for the preparation of composite material as mentioned above which can be industrialized, that is to say with a short cycle time (in general not exceeding 15 minutes).

Another aim of the present invention is to provide a composite material as defined above, in particular intended for the production of soles of sports shoes, which shows cohesive failure in the vulcanized elastomer during separation stress.

It is recalled that failure is termed cohesive if, when the two materials are separated, failure does not take place at the interface of said materials. In contrast, when failure does take place at said interface it is termed adhesive.

Other advantages associated with the implementation of the present invention will become apparent in the course of the description which follows.

DETAILED DESCRIPTION OF THE PREFERRED EMBODIMENTS OF THE INVENTION

The present invention includes the preparation process comprises vulcanizing an elastomer composition comprising a synthetic or natural elastomer containing carboxylic acid or dicarboxylic acid anhydride groups, a crosslinking system and, optionally, diverse adjuvants and fillers in a mold, one part of which is occupied by a thermoplastic elastomer containing polyamide blocks, the vulcanization temperature being between −15° C. and +5° C. with respect to the Vicar point of said thermoplastic elastomer containing polyamide blocks.

Preferably, the elastomer composition and the vulcanization kinetics are such that the material shows cohesive failure in the vulcanized elastomer when stress is applied to separate the two elastomers.

The vulcanized and thermoplastic elastomers forming the composite material are usually combined sufficiently strongly to prevent any separation during normal exertion, taking account of the desired use. Thus, in the sense of the present text, the term separation implies the application to the material of a force considerably higher than that to which the said material must normally be subjected.

Suitable vulcanizable natural or synthetic elastomers for the implementation of the present invention are well known to those skilled in the art, the term elastomer in the definition of the present invention signifying that said elastomer may be composed of mixtures of several elastomers.

These elastomers or mixtures of elastomers have a compression set (CS) at 100° C. of less than 50%, generally between 5 and 40% and preferably less than 30%.

Amongst said elastomers, the following may be mentioned: natural rubber, polyisoprene having a high proportion of double bonds in the cis position, a polymerized emulsion based on styrene/butadiene copolymer, a polymerized solution based on styrene/butadiene copolymer, a polybutadiene having a high proportion of double bonds in the cis position obtained by nickel, cobalt, titanium or neodymium catalysis, a halogenated ethylene/propylene/diene terpolymer, a halogenated butyl rubber, a styrene/butadiene block copolymer, a styrene/isoprene block copolymer, the halogenated products of the above polymers, an acrylonitrile/butadiene copolymer, an acrylic elastomer, a fluorinated elastomer and chloroprene.

In the case where the elastomers mentioned above do not contain any carboxylic acid radicals or anhydride radicals of said acids (which is the case for the majority of said elastomers), said radicals will be supplied by grafting, in a known manner, the abovementioned elastomers, or by mixtures of elastomers, for example with acrylic elastomers.

Amongst the elastomers mentioned above, those included in the following group will advantageously be chosen: carboxylated nitrile elastomers, acrylic elastomers, carboxylated polybutadienes, ethylene/propylene/diene graft terpolymers or mixtures of these polymers with the same elastomers but ungrafted, such as nitrile rubbers, polybutadienes or ethylene/propylene/diene terpolymers, on their own or as a mixture.

Preferably, the abovementioned vulcanizable elastomers comprise a proportion by weight of carboxylic acid or dicarboxylic acid anhydride radicals of between 0.3 and 10% with respect to said elastomers.

The vulcanization systems suitable for the present invention are well known to those skilled in the art and consequently the invention is not restricted to systems of a particular type. It suffices that the said system meets the criteria relating to the vulcanization kinetics defined in the definition of the invention indicated above.

When the elastomer is based on an unsaturated monomer (butadiene, isoprene, vinylidene-norbornene, etc.) four types of vulcanization systems may be used:

(1) Sulfur-based systems composed of sulfur in combination with the usual accelerators, such as the metal salts of dithiocarbamates (zinc dimethyldithiocarbamate, tellurium dimethyldithiocarbamate, etc.), thiuram disulfides (thiuram tetramethyl disulfide, etc.), sulferamides, etc.

These systems may also contain zinc oxide in combination with stearic acid.

(2) Sulfur-donor systems in which the majority of the sulfur used for curing originates from sulfur-containing molecules such as the organosulfur compounds mentioned above.

(3) Systems based on phenolic resins, composed of difunctional formophenolic resins, which may be halogenated, in combination with accelerators such as stannous chloride or zinc oxide.

(4) Systems based on peroxides. All free-radical donors may be used (dicumyl peroxides, etc. ) in combination with zinc oxide and stearic acid.

When the elastomer is acrylic (butyl polyacrylate with acid or epoxy groups or any other reactive group allowing crosslinking) the customary crosslinking agents based on diamines (ortho-toluidylguanidine, diphenylguanidine, etc.) or block diamines (hexamethylenediamine carbamate etc.) are used.

The elastomer compositions may be modified to have certain particular properties (improvement of the mechanical properties, for example) by the addition of fillers such as carbon black, silica, kaolin, aluminum, clay, talc, chalk, etc. These fillers may be surface-treated with silanes, polyethylene glycols or any other coupling molecule. In general, the filler content in parts by weight is between 5 and 100 per 100 parts of elastomer.

In addition, the compositions may be softened by plasticizers such as mineral oils derived from petroleum, phthalic acid esters or sebacic acid esters, liquid polymeric plasticizers, such as optionally carboxylated polybutadiene of low mass, and other plasticizers well known to those skilled in the art.

The vulcanizing agent combinations used to carry out the process are such that they must permit complete crosslinking of the elastomer in accordance with kinetics leading to good separation resistance properties, as mentioned in the definition of the invention, and, in general, to good rubberlike properties (measured by a compression set at 100° C., tensile properties under traction, etc.).

Preferably, the vulcanization temperature is lower than or equal to the Vicar point of the thermoplastic elastomer comprising polyamide blocks.

The vulcanization temperature in the mold will advantageously be between 130° and 180° C.

Advantageously, the kinetics determined with the aid of an oscillating rheometer will be such that the characteristic 90% vulcanization time, $t_{90}$, does not exceed 15 minutes and advantageously will be between 5 and 10 minutes.

In addition, it has been found that the vulcanization initiation time (or setting time) corresponding to a 0.2N m increase in torque is an important factor for the production of materials having good performance. Thus, it is advantageous that the abovementioned increase in torque is achieved within a time of more than or equal to 4 minutes at the molding temperature and preferably of between 4 and 6 minutes.

With regard to the point termed the Vicar point or the softening point, it is known that this is a well-known parameter for determining the physical properties of a polymer. The Vicar point is the temperature at which a needle having a circular cross-section of 1 $mm^2$ enters the sample to a depth of 1 mm during a temperature rise of 50° C. per hour in accordance with ASTM Standard D1525. Thus, at this temperature the polymer does not flow and is not in the molten state.

The thermoplastic elastomers containing polyamide blocks are those in which the polyamide blocks are separated by different blocks, such as polyesters, polyethers or polyurethanes, for example.

The thermoplastic elastomers containing polyamide blocks advantageously used for carrying out the process are polyethers polyamide blocks (or polyetheramides).

Polyethers containing polyamide blocks are equally understood to be those random polyethers containing polyamide blocks (that is to say formed by random linking of the diverse monomer constituents) and block polyethers containing polyamide blocks, that is to say blocks having a certain chain length of their diverse constituents.

The polyethers containing polyamide blocks which are suitable for the present invention are well known to those skilled in the art. They are obtained by a condensation reaction of polyamide blocks with reactive ends with polyether blocks with reactive ends, such as, inter alia:

1. Polyamide blocks with diamine chain ends with polyoxyalkylene blocks with dicarboxylic chain ends.

2. Polyamide blocks with dicarboxylic chain ends with polyoxyalkylene blocks with diamine chain ends obtained by cyanoethylation and hydrogenation of aliphatic alpha,omega-dihydroxylated polyoxyalkylene blocks termed polyetherdiols.

3. Polyamide blocks with dicarboxylic chain ends with polyetherdiols, the polyetheramides obtained being, in this particular case, polyetheresteramides.

The composition and the production of such polyetheresteramides have been described in French Patents Nos. 74 18913 and 77 26678 in the name of the Applicant, the contents of which are added to the present description.

According to one embodiment of the invention, the polyetheramide is a block polyetheresteramide having a molecular weight of more than 10,000, formed from the copolycondensation product of an alpha,omega-dicarboxylic polyamide or copolyamide having a molecular weight of 300 to 15,000 and preferably 600 to 5000, used in an amount of 95 to 15% by weight, and a polyetherdiol having a molecular weight of 100 to 6000 and preferably 200 to 3000, used in an amount of 5 to 85% by weight.

Polyethers which may be mentioned are polyoxyethylene glycol, polyoxypropylene glycol and polyoxytetramethylene glycol, having an average molecular weight of between 100 and 6000, preferably of between 200 and 3000. These polyethers may also result from mixtures of polymers mentioned above. The lengthening of the polyether chains is ensured by ester bonds.

With regard to the polyamides, those which are available and known under the names nylon 6, 11, 12, 66 and 612 will preferably be used.

Advantageously, these polyethers containing polyamide blocks will have a Vicat point of between 100° and 200° C., preferably of between 130° and 175° C., and a melting point of between 120° and 210° C. and preferably of between 140° and 180° C.

In general, the process comprises forming a thermoplastic elastomer containing polyamide blocks, and in particular a polyether containing polyamide blocks, and then arranging the thermoplastic elastomer containing polyamide blocks by appropriate means in a vulcanization mold, preferably in such a way that it is placed against one of the walls of the mold. Then, in the case where the elastomer is a film, the latter is formed by extrusion in particular. Its thickness will preferably vary between 0.3 and 5 mm, and advantageously less than or equal to 1 mm. The width of the film is variable and it may be cut using a hollow punch. The film part is then positioned against at least part of the wall of the elastomer vulcanization mold, in a known manner. The film parts may also be stored for the desired time.

In the case where the thermoplastic elastomer is formed from an element of defined shape, for example in the shape of a cut section, the latter is preferably placed on the bottom of the mold.

It is also possible to use a mold with sequenced bi-material injection. In this case the mold is equipped with cavity masks for the elastomer part, which are retracted after injection of the thermoplastic, so that the elastomer can be injected.

The elastomer composition containing the elastomer with its fillers, plasticizers and other adjuvants, but without the crosslinking system, is formulated in an appropriate reactor and is then, if appropriate, placed in another mixer, at an appropriate temperature, with the vulcanization system.

Molding of the elastomer and its vulcanization are carried out in the mold, one part of which is occupied by the part of polyether containing polyamide blocks, as indicated above, in accordance with one of the conventional processes of the rubber industry: simple compression, transfer compression, injection, transfer injection. In general, it is carried out in a steel compression mold a few millimeters thick, placed between two hot plates of a press. The amount of elastomer composition introduced into the mold may be slightly greater than the volume of the cavity. Closure of the press gives rise to flow of the elastomer into the mold and removal of the excess elastomer through the overflow channels. Thus, after distribution of the material, and taking account of the geometry of the mold, the pressure on the elastomer composition is low (close to atmospheric pressure). According to this variant, and surprisingly, it was found that the materials obtained had excellent properties in the case where the temperature of the plate at the top of the mold was equal to the Vicat temperature of the thermoplastic elastomer to within 5° C. and the temperature of the bottom plate of the mold was between the Vicat temperature of the thermoplastic elastomer and the Vicat temperature minus 15° C.

When the vulcanization is complete, at the end of a period of less than 15 minutes and advantageously of between 5 and 10 minutes, determined beforehand by means of the $t_{90}$ of the oscillating rheometer, the article is removed.

In the case where the thermoplastic elastomer is a film, an empirical formula well known in the elastomer vulcanization technique is applied when the thickness is changed:

Vulcanization time (min)=$t_{90}$+(E/2–2)

E being the thickness in mm.

The invention also relates to a composite material formed from a vulcanized elastomer directly combined with a thermoplastic elastomer comprising polyamide blocks and having a melting point of between 120° and 210° C., the said composite material exhibiting a cohesive failure inside the vulcanized elastomer during separation. The vulcanized elastomers are those which have been described above when explaining the process for the preparation of the composite material, including the variants relating to the addition of fillers or of plasticizers, in particular.

The term directly signifies that no adhesive is present between said elastomers.

With regard to the polyethers containing polyamide blocks, reference will also be made to the above explanation with regard to the preparation process.

Preferably, the polyamide blocks will be chosen from polyamides 6, 11 or 12 and the polyether blocks will be chosen from polyethylene oxides, polypropylene oxides and polytetramethylene oxides or a mixture of these various units having a molecular weight of between 100 and 6000.

The resistance to separation is estimated by various standardized tests, which will be chosen depending on the type of composite material under consideration.

If the polyether containing polyamide blocks is in the form of a film, the resistance to separation will be determined by the peel test. Preferably, the peel strength will advantageously be greater than 6 daN/cm.

In the case which is of most interest from an industrial standpoint, where the thermoplastic elastomer containing polyamide blocks is a block or article having a defined shape, for example a reinforcing element partially embedded, or inserted, in the vulcanized elastomer, the tensile strength will be determined. This will vary depending on the shape of the article.

The invention finds particularly worthwhile application for the production of sports articles of which at least part is composed of a composite material as defined above.

The invention is thus advantageously suitable for the production of sports shoe soles, at least part of which is made of vulcanized elastomer comprising one or more reinforcing elements of thermoplastic elastomer as described above.

The examples below illustrate the invention without, however, restricting it.

According to a general implementation process common to all of the examples described, the elastomer composition without the crosslinking system is formulated in a 3.5 liter Repiquet K1 internal mixer, the rotors of which rotate at 60 rpm. The operation takes place under a semi-adiabatic regime, with conversion of the mechanical energy to heat. An intimate mixture is obtained in less than 5 minutes and the temperature reaches 110° C.

The elastomer formulated in this way is then transferred to a roll mill, the rolls of which are heated to 80° C., and the vulcanization system is added to it.

Overmolding of the elastomer composition on the part composed of thermoplastic elastomer comprising polyamide blocks takes place in a steel compression mold, placed between the two hot plates of a press.

The peel strength is determined at the end of 24 hours. Peeling is initiated by providing a region without adhesion between vulcanized elastomer and the polyether containing polyamide blocks using an aluminum adhesive tape placed on the polyether comprising polyamide blocks before molding the elastomer.

EXAMPLE 1

An elastomer composition comprising, in parts by weights

| Butadiene-acrylonitrile copolymer (marketed under the trade name Krynac 2750) | 80 |
| 69/24/7 butadiene-acrylonitrile-acrylic acid terpolymer | 20 |
| Silica | 20 |
| Silane | 1 |
| Dioctyl phthalate | 5 |
| Silica treatment agent | 2 |
| $TiO_2$ | 10 |
| Antioxidant | 1 | is mixed with a vulcanization system having the following composition, in parts by weight:

| ZnO | 5 |
| Stearic acid | 1 |
| Dicumyl peroxide (containing 40%, of chalk) | 5 |

It is then cast a mold formed from a film of polyether containing polyamide blocks (PEBA) marketed under the trade name PEBAX 6333, which has a Vicat point of 161° C., which film has a thickness of 0.5 mm and is placed on the bottom side of the mold cavity.

The molding conditions are as follows

| Temperature of top plate | 160° C. |
| Temperature of bottom plate | 155° C. |
| Vulcanization time | 10 minutes |

EXAMPLE 2

Example 1 is repeated except that the following mixture of elastomers is used:

| Butadiene-acrylonitrile copolymer | 70 |
| 69/24/7 butadiene-acrylonitrile-acrylic acid terpolymer | 30 |

EXAMPLE 3

Example 1 is repeated except that the 69/24/7 butadiene/acrylonitrile/acrylic acid terpolymer elastomer is used as the only elastomer.

EXAMPLE 4

An elastomer combination comprising, in parts by weight:

| Carboxylated polybutadiene containing 7% of carboxylic acid | 5 |
| 85/15 butadiene-styrene copolymer | 70 |
| 69/24/7 butadiene-acrylonitrile-acrylic acid terpolymer | 30 |
| Silica | 20 |

-continued

| Silane | 1 |
| Dioctyl phthalate | 5 |
| Silica treatment agent | 2 |
| $TiO_2$ | 10 |
| Antioxidant | 1 | is mixed with a vulcanization system having the following composition, in parts by weight:

| Sulfur | 2 |
| Mercaptobenzothiazole disulfide | 1.5 |
| Tetramethylthiuram disulfide | 0.5 |
| ZnO | 5 |
| Stearic acid | 2 |

This elastomer has a setting time of 4 minutes 20 seconds at 160° C.

Processing is in accordance with the procedure described in Example 1.

COMPARATIVE EXAMPLE 1 (CE1)

Example 1 is repeated except that the 69/24/7 butadiene-acrylonitrile-acrylic acid terpolymer is replaced by a 73/27 butadiene-acrylonitrile copolymer in the same proportions.

COMPARATIVE EXAMPLE 2 (CE2)

Example 4 is repeated except that the 69/24/7 butadiene-acrylonitrile-acrylic acid terpolymer is replaced by 85/15 butadiene-styrene copolymer in the same amounts, which leads to 100 parts of the latter copolymer.

TABLE 1

| Examples | 1 | 2 | 3 | 4 | CE1 | CE2 |
|---|---|---|---|---|---|---|
| Vicat point °C. | 161 | 161 | 161 | 161 | 161 | 161 |
| Processing conditions: | | | | | | |
| Top temperature | 160 | 160 | 160 | 160 | 160 | 160 |
| Bottom temperature | 155 | 155 | 155 | 155 | 155 | 155 |
| Peel strength daN/cm | 7.5 | 11.9 | 8.3 | 9.2 | 0.3 | 0 |
| Failure remarks | cohesive | cohesive | cohesive | cohesive | adhesive | adhesive |

The aim of Examples 7, 8 and 9 below is to illustrate the effect of the processing temperature as a function of the Vicar point of the polyether comprising polyamide blocks (PEBA).

EXAMPLE 7

Example 2 was repeated except that the bottom plate temperature is 150° C. (instead of 155° C. in Example 1).

The peel strength in daN/cm is 8.5 and the failure is cohesive.

EXAMPLE 8

Example 2 was repeated except that the PEBA used is marketed under the trade name PEBAX 5533 and has a Vicat point of 144° C. and except that the temperatures of the top and bottom plates were changed to 140 and 140 respectively. The peel strength in daN/cm is 10.75 and failure is cohesive.

EXAMPLE 9

Example 2 was repeated except that the PEBA used is marketed under the trade name PEBAX 7033 and has a Vicat point of 165° C. and except that the temperatures of the top and bottom plates were changed to 165 and 155 respectively. The peel strength in daN/cm is 8 and failure is cohesive.

It was also verified that the same performance was obtained with thicknesses of 0.8 and 1.6 mm.

EXAMPLE 10

A part in the shape of a semicircle 2 mm thick is produced by thermoplastic injection molding using PEBAX 6333.

An elastomer having the formulation of Example 1 and a vulcanization system composed of:

| | |
|---|---|
| Zinc oxide: | 5 parts per hundred |
| Stearic acid: | 2 parts per hundred |
| Sulfur: | 2 parts per hundred |
| Mercaptobenzothiazole disulfide | 1.5 parts per hundred |
| Tetramethylthiuram disulfide | 0.5 parts per hundred | is then overmolded on this PEBAX part, using the elastomer injection molding procedure, using an REP M36 press having a closing force of 700 kN and fitted with a plasticizing screw and a piston-actuated transfer pot.

The PEBAX part is inserted into the cavity of the bottom plate of an elastomer mold, the top plate of which is provided with four cavities in the shape of studs 6 mm high identical to the studs on the soles of football boots. These cavities are supplied via small nozzles connected to the transfer pot by means of a system of cylindrical channels.

Injection molding is carried out at a stock temperature of 120° C. and a piston speed of 30 mm/s. The temperatures of the top and bottom plates are, respectively, 160° and 155° C. and the part is demolded at the end of 6 minutes.

The part thus obtained shows cohesive failure in the rubber when the tensile stud tear-away test is carried out.

The composite part has good abrasion resistance and compression elasticity of the nitrile rubber, whilst the PEBAX supplies the dynamic mechanical properties, the lightness and foot comfort.

We claim:

1. A process for the preparation of a composite material comprising preparing a vulcanizable elastomer composition containing a vulcanizable elastomer having carboxylic acid or dicarboxylic acid anhydride groups, a crosslinking system and, optionally, diverse adjuvants; and vulcanizing said composition while in contact with a thermoplastic elastomer containing polyamide blocks, the vulcanization temperature being between −15° and +5° C. with respect to the Vicat point of said thermoplastic elastomer containing polyamide blocks, thus forming a composite of a vulcanized elastomer and said thermoplastic elastomer.

2. The process as in claim 1, wherein said vulcanizable elastomer composition is vulcanized in a mold, a part of which is occupied by said thermoplastic elastomer.

3. The process as in claim 1, wherein the vulcanizable elastomer is a carboxylated nitrile elastomer, acrylic elastomer, carboxylated polybutadiene, ethylene/propylene/diene graft terpolymer or mixture of these polymers with the same elastomers, but ungrafted.

4. The process as in claim 3, wherein said elastomer is grafted and mixed with an ungrafted nitrile rubber, polybutadiene, ethylene/propylene/diene terpolymer or mixture thereof.

5. The process as in claim 1, wherein the vulcanizable elastomers comprise a proportion of carboxylic acid or diacid anhydride radicals of between 0.3 and 10% with respect to said elastomers.

6. The process as in claim 1, wherein the elastomer composition comprises fillers, the proportion of fillers being, in parts by weight, between 5 and 100 per 100 parts of elastomer.

7. The process as in claim 1, wherein the vulcanization temperature is lower than or equal to the Vicat point of the thermoplastic elastomer containing polyamide blocks.

8. The process as in claim 1, wherein said vulcanizing has a characteristic 90% vulcanization time, $t_{90}$, which does not exceed 15 minutes.

9. The process as in claim 8, wherein the characteristic 90% vulcanization time, $t_{90}$, is between 5 and 10 minutes.

10. The process as in claim 1, wherein said vulcanizing has a vulcanization initiation time corresponding to a 0.2N m increase in torque between 4 and 6 minutes.

11. The process as in claim 1, wherein the polyamide is a polyether containing polyetheramide blocks.

12. The process as in claim 11, wherein the polyethers containing polyamide blocks have a Vicat point of between 100° and 200° C.

13. The process as in claim 12, wherein said Vicat point is between 130° and 175° C.

14. The process as in claim 1, wherein:
   a) a thermoplastic polyether elastomer containing polyamide blocks is formed,
   b) said elastomer is placed in a vulcanization mold, and
   c) the vulcanizable elastomer composition is introduced into, and vulcanized in, the mold at a temperature of between 130° and 180° C.

15. The process as in claim 14, wherein the vulcanization mold is placed between a top and a bottom plate, the temperature of the top plate of the mold being equal to the Vicat temperature of the thermoplastic elastomer to within ±5° C. and the temperature of the bottom plate of the mold being between the Vicat temperature of the thermoplastic elastomer and 15° C. minus the Vicat temperature of the thermoplastic elastomer.

16. A composite material formed from a vulcanized elastomer containing carboxylic acid or dicarboxylic acid anhydride groups, directly combined with a thermoplastic elastomer containing polyamide blocks, said composite material showing cohesive separation inside the vulcanized elastomer during separation stress.

17. The composite material as in claim 16, wherein the thermoplastic elastomer has a melting point of between 120° and 210° C.

18. The composite material as in claim 16, wherein said vulcanized elastomer is a carboxylated nitrile elastomer, acrylic elastomer, carboxylated polybutadiene, ethylene/propylene/diene graft terpolymers or mixtures of these polymers with the same elastomers, but ungrafted.

19. The composite material as in claim 18, wherein said elastomer is grafted and mixed with an ungrafted nitrile rubber, polybutadiene, ethylene/propylene/diene terpolymer or mixture thereof.

20. The composite material as in claim 16, wherein said vulcanized elastomer comprises fillers, the proportion of fillers being, in parts by weight, between 5 and 100 per 100 parts of said vulcanized elastomer.

21. The composite material as in claim 16, wherein the thermoplastic elastomer is a polyether containing polyamide blocks.

22. The composite material as claimed in claim 21, wherein the polyamide is chosen from polyamides 6, 11 or 12 and the polyether blocks are chosen from polyethylene oxides, polypropylene oxides and polytetramethylene oxides or a mixture of these units.

23. A sports article, at least part of which comprises the material as defined in claim 16.

24. A sports shoe sole, at least part of which comprises a composite material as claimed in claim 16, formed from a vulcanized elastomer comprising one or more reinforcing elements of thermoplastic elastomers.

25. A sports article, at least part of which comprises the material as defined in claim 17.

26. A sport shoe sole, at least part of which comprises a composite material as claimed in claim 17, formed from a vulcanized elastomer comprising one or more reinforcing elements of thermoplastic elastomers.

* * * * *